(12) United States Patent
Wang et al.

(10) Patent No.: US 9,948,486 B2
(45) Date of Patent: Apr. 17, 2018

(54) PHASE-SHIFT-KEYING (PSK) PILOT

(71) Applicant: QUALCOMM Incorporated, San Diego, CA (US)

(72) Inventors: Xiao Feng Wang, San Diego, CA (US); Alberto Rico Alvarino, San Diego, CA (US); Peter Gaal, San Diego, CA (US); Wanshi Chen, San Diego, CA (US); Hao Xu, San Diego, CA (US); Seyed Ali Akbar Fakoorian, San Diego, CA (US); Jing Lei, San Diego, CA (US); Renqiu Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/293,920

(22) Filed: Oct. 14, 2016

(65) Prior Publication Data

US 2017/0230213 A1 Aug. 10, 2017

Related U.S. Application Data

(60) Provisional application No. 62/292,124, filed on Feb. 5, 2016.

(51) Int. Cl.
*H04L 25/49* (2006.01)
*H04L 27/18* (2006.01)
(Continued)

(52) U.S. Cl.
CPC .............. *H04L 27/18* (2013.01); *H04L 5/005* (2013.01); *H04L 27/265* (2013.01); *H04L 27/2614* (2013.01)

(58) Field of Classification Search
CPC ........... H03F 1/327; H03F 3/24; H04L 27/368
(Continued)

(56) References Cited

U.S. PATENT DOCUMENTS

| 2005/0094550 A1 | 5/2005 | Huh et al. |
| 2006/0172704 A1* | 8/2006 | Nishio .................. H04L 5/0007 455/67.11 |

(Continued)

FOREIGN PATENT DOCUMENTS

| EP | 1643669 A1 | 4/2006 |
| WO | 2009078651 A2 | 6/2009 |

OTHER PUBLICATIONS

International Search Report and Written Opinion—PCT/US2016/062886—ISA/EPO—dated Feb. 22, 2017.

*Primary Examiner* — Khai Tran
(74) *Attorney, Agent, or Firm* — Nerrie M. Zohn

(57) ABSTRACT

The apparatus enables pilot signals, whether single tone or multiple tone, that achieve a very low PAPR. After receiving an allocation for multiple tones, the apparatus determines a pilot signal for transmission. The apparatus may select tones from the allocation for transmission of a pilot signal based on a pilot pattern. The pilot pattern may comprise a tone sequence that identifies a sequences of tones, wherein each tone in the tone sequence of identifies one tone of multiple tones for transmission of a pilot signal during a given pilot symbol period. The pilot signal may also comprise a signal sequence. The apparatus may generate a set of multi-tone modulated pilot sequences, select a pilot sequence based on a cross-correlation property, and transmit a pilot signal using multiple tones of the allocation using the selected pilot sequence.

26 Claims, 12 Drawing Sheets

(51) Int. Cl.
*H04L 5/00* (2006.01)
*H04L 27/26* (2006.01)

(58) Field of Classification Search
USPC .................. 375/297, 260, 269; 370/330, 343
See application file for complete search history.

(56) References Cited

U.S. PATENT DOCUMENTS

| | | | |
|---|---|---|---|
| 2010/0166090 A1 | 7/2010 | Ho | |
| 2011/0216734 A1* | 9/2011 | Yu | H04J 11/00 370/330 |
| 2013/0177100 A1* | 7/2013 | Kim | H04L 5/0007 375/295 |
| 2017/0111147 A1* | 4/2017 | Cao | H04L 27/2613 |

* cited by examiner

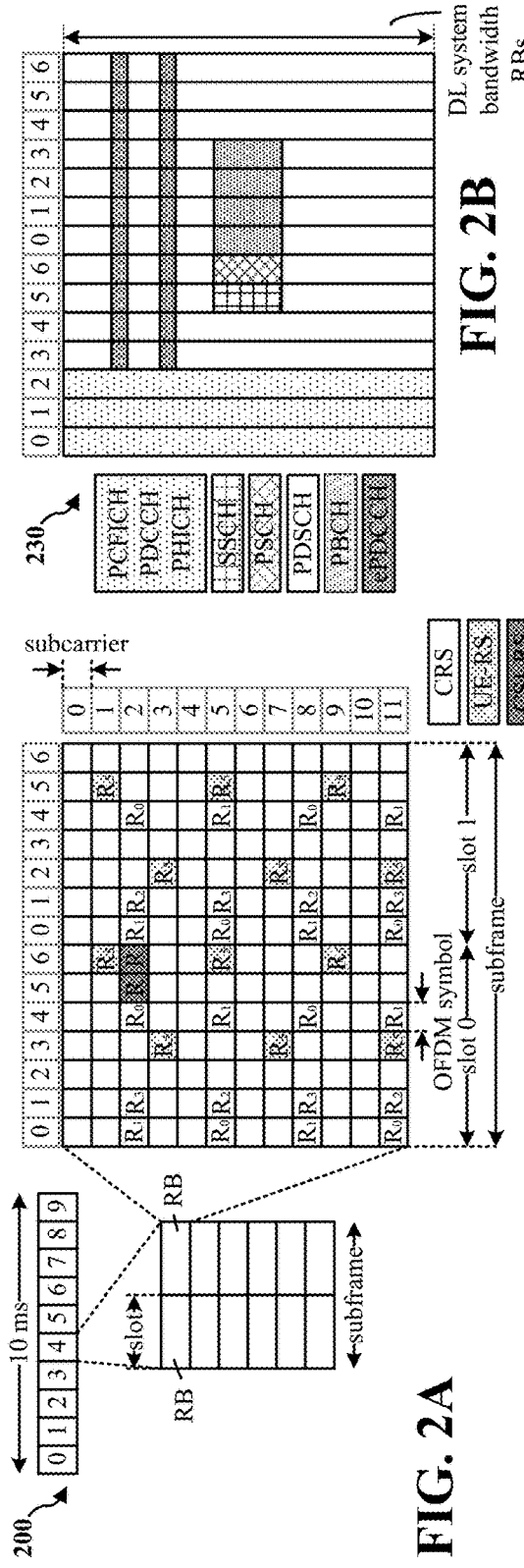
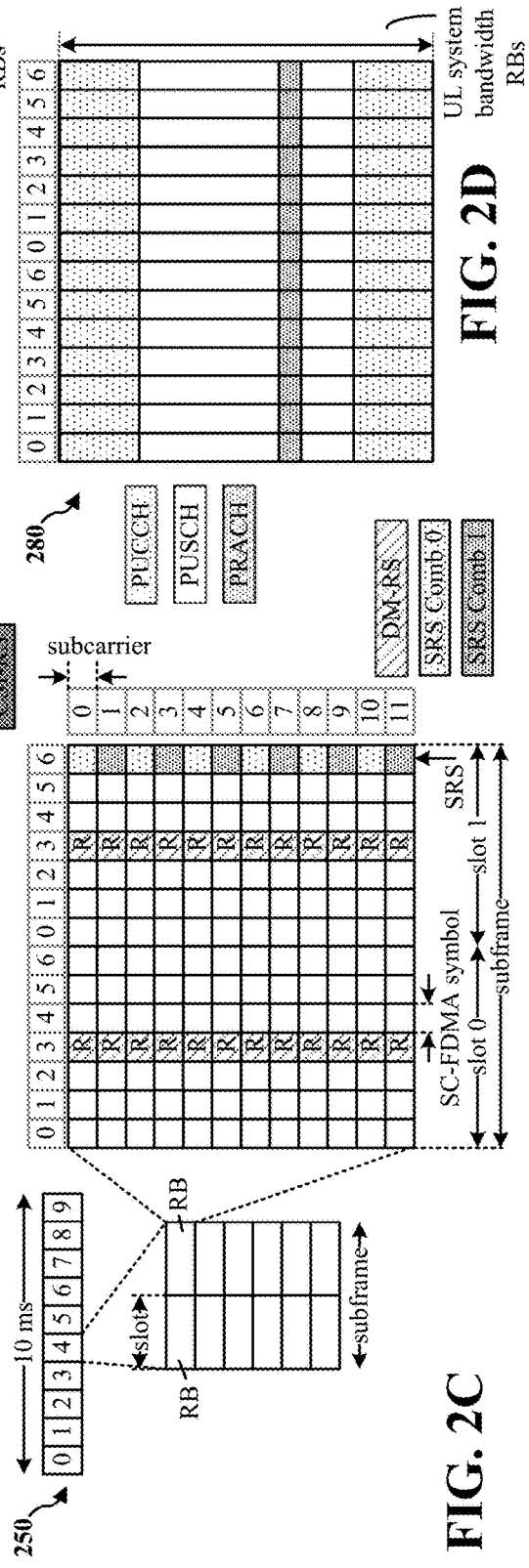

PHASE-SHIFT-KEYING (PSK) PILOT

CROSS-REFERENCE TO RELATED APPLICATION

This application claims the benefit of U.S. Provisional Application Ser. No. 62/292,124, entitled "Phase-Shift-Keying (PSK) Pilot" and filed on Feb. 5, 2016, which is expressly incorporated by reference herein in its entirety.

BACKGROUND

Field

The present disclosure relates generally to communication systems, and more particularly, to signal modulation and phase-shift-keying (PSK) pilot signals.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

OFDM signals may have a relatively high peak-to-average power ratio (PAPR). High PAPR may lead to the necessity of high-resolution analog-to-digital converters (ADCs), high-resolution digital-to-analog converters (DACs), and power amplifiers having high linearity. Oftentimes, high-linearity power amplifiers have lower power efficiency, due to the amount of power needed to produce an effective signal, as well as higher cost. Although OFDM may be commonly used in downlink transmissions from a base station, such as an evolved Node B (eNB), the disadvantages of power and cost associated with OFDM can make OFDM poorly suited for mobile devices that need reduced power consumption in order to maintain a long battery life.

For reduced PAPR, SC-FDMA can be used. The reduced PAPR associated with SC-FDMA enables increased power efficiency when compared to OFDMA. The reduced PAPR makes SC-FDMA suitable for transmissions from a mobile device/user equipment (UE), such as an uplink transmission of a UE operating according to the LTE standard of telecommunication. Although SC-FDMA reduces PAPR when compared to conventional OFDMA, SC-FDMA still has a relatively large PAPR when a relatively large number of tones are allocated for the uplink transmission of the signal.

Much effort has been made to reduce signal PAPR of OFDM and SC-FDMA signals without significant success. With the advent of internet of things (IOT), there is a growing need for very low-power wireless communication devices to enable extended battery life. This in turn calls for modulation schemes with very low PAPR.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

With the advent of internet of things (IOT), there is a growing need for very low-power wireless communication devices to enable extended battery life. This in turn calls for modulation schemes with very low PAPR.

Aspects presented herein enable pilot signals, whether single tone or multiple tone, that achieve a very low PAPR.

In an aspect of the disclosure, a method, a computer-readable medium, and an apparatus are provided. The apparatus receives an allocation for multiple tones and selects tones for transmission of a pilot signal based on a pilot pattern. The pilot pattern may comprise a tone sequence that identifies a sequences of tones, wherein each tone in the tone sequence of identifies one tone of multiple tones for transmission of a pilot signal during a given pilot symbol period. The apparatus may then transmit a modulated pilot signal using the selected tones, wherein the pilot signal is transmitted using a single tone per pilot symbol period. The pilot signal may be modulated with a phase change, such as using m-ary phase shift keying (MPSK). The pilot signal may be based on a pilot pattern, wherein the pilot pattern comprises a tone sequence and a signal sequence. The pilot signal may comprise a tone-phase-shift keying (TPSK) pilot signal. The tone sequence or signal sequence is based on at least one of a cell identifier (cell ID), a user equipment identifier (UE ID), or a set of tones allocated.

In another aspect, a data transmission may be linked to the transmission of a pilot signal by linking the data transmission to a tone following a first tone of the pilot signal in time, wherein the data transmission is transmitted using a tone spacing relative to the first tone of the pilot signal.

In another aspect of the disclosure, a method, a computer-readable medium, and an apparatus are provided. The apparatus receives an allocation for a plurality of tones, generates a set of multi-tone modulated pilot sequences, selects a pilot sequence based on a cross-correlation property, and transmits a pilot signal using multiple tones of the allocation using the selected pilot sequence. The pilot signal may be generated using 8-binary-phase-shift-keying (8-BPSK) modulation and/or Discrete Fourier Transform (DFT). The selection of the pilot sequence may include selecting a subset of the set of multi-tone modulated sequences, the subset comprising at least two sequences having a lower cross-correlation. The selection may be based on at least one of cell ID, UE ID, or a set of allocated tones. The selection may also be based on PAPR.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
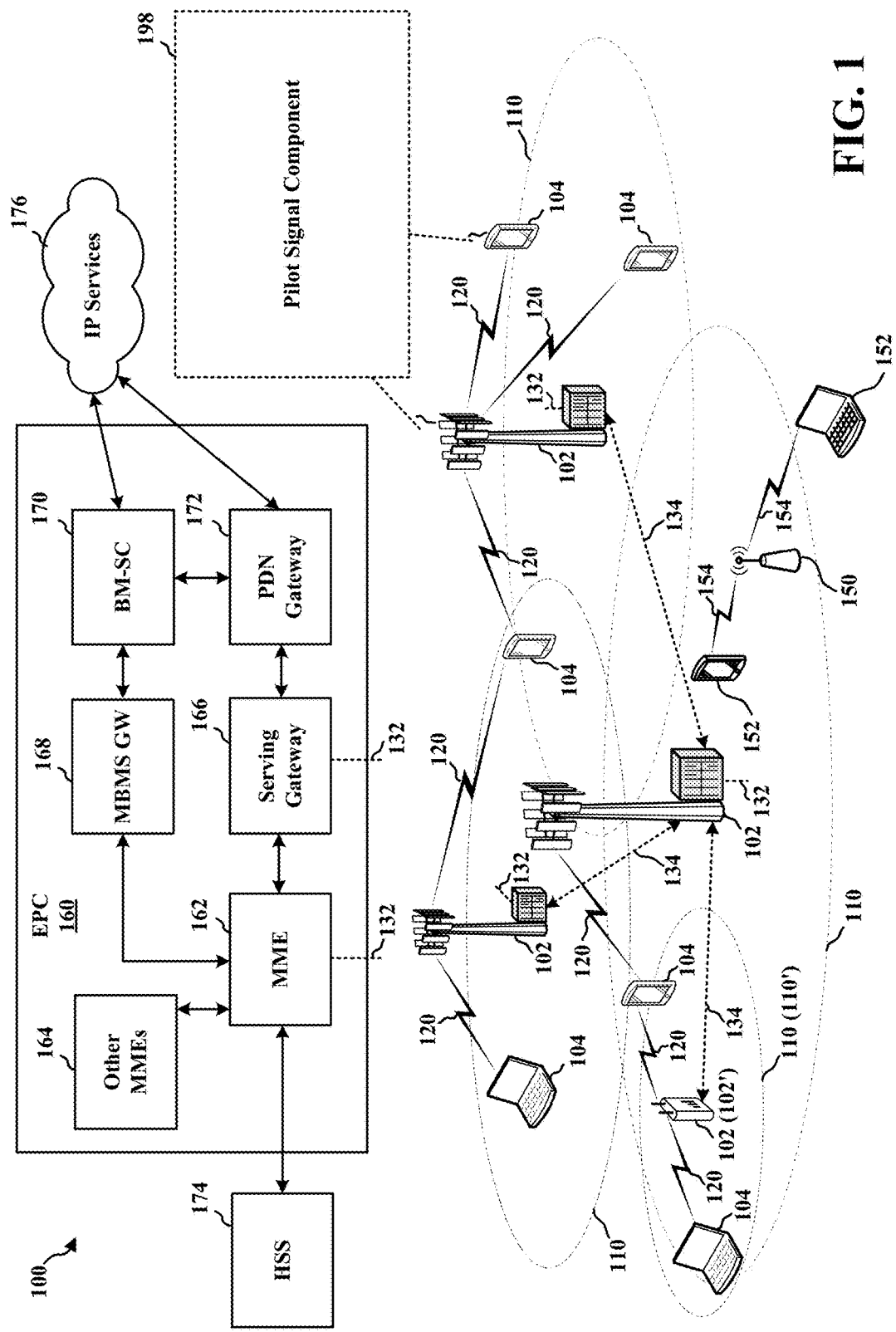
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE may include a pilot signal component 198 that is configured to transmit a pilot signal, whether a single tone pilot signal such as TPSK, or a multiple tone pilot signal such as 8-BPSK, that maintains a low PAPR, e.g., approximately 0 dB PAPR. Examples of transmitting such a pilot signal are described in connection FIGS. 4, 5, 6, 7, and 10.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
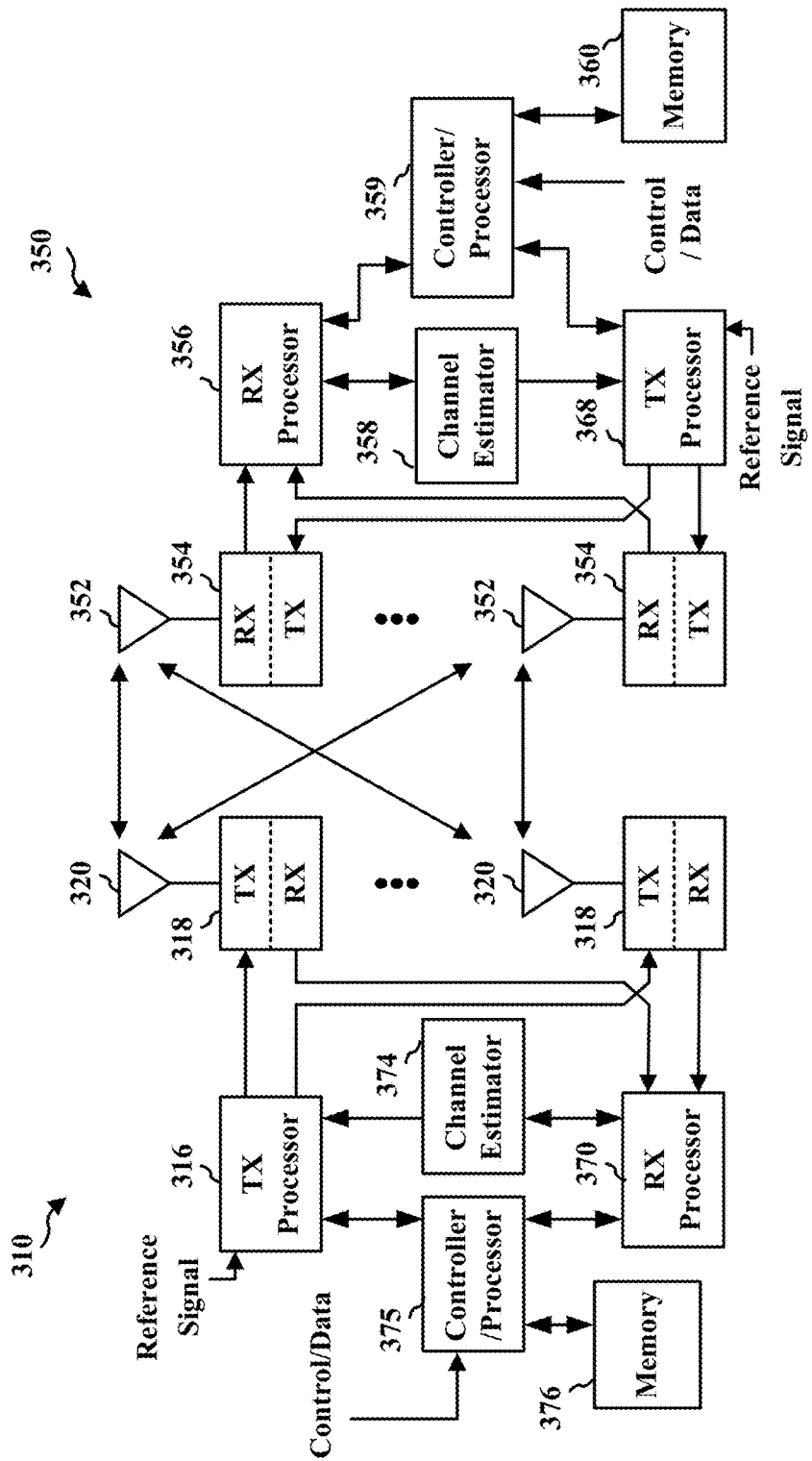
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356.

The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

A base station, e.g., 102, 310 and a UE 104, 350 may employ data modulation in the data transmissions. For example, in a wireless communication method, such as WLAN, LTE, etc., a UE may be allocated one or more resource elements that may be used to transmit data and/or control information, each resource element comprising a tone (in the frequency domain) in a symbol (in the time domain). As an example, the resource elements may be allocated to the UE using a transmission 120 from a base station 102, such as eNB 310.

Once the UE determines which resource elements are allocated to the UE (e.g., which tones are allocated in a particular symbol), the UE may select one or more of the allocated resource elements, and may determine to modulate data into the selected resource element(s). The manner in which the UE selects the resource elements and modulates the data may correspond to an agreed upon modulation scheme, which in turn may correspond to an agreed upon mapping of allowed data values to allowed modulated values. Thereafter, the UE may transmit a signal 120 including information (e.g., one or more modulated values) contained in one or more of the allocated resource elements. Then, the base station may receive the signal, detect which of the resource elements includes modulated values for indicating data from the UE, and may demodulate the resource elements to determine the information of the signal sent by the UE (e.g., by comparing a received modulated value of a demodulated resource element to a closest matching allowed modulated value indicated in a constellation point set of the mapping known to the base station, and by then determining which data value corresponds to the closest matching allowed modulated value based on the mapping).

Configurations described below provide constant-envelope modulation schemes (e.g., 0 dB PAPR) that can be used in SC-FDMA signal generation. In general, configurations of the modulation schemes described below use a mapping to match modulated signals with data values (e.g., a constellation point index linking respective data values to various constellation points, or to one or more modulated values in one or more of a plurality of tones). A device seeking to transmit a signal containing a data value using the described modulation schemes (e.g., UE seeking to transmit signal) might choose only a relatively small subset of allocated tones to transmit m-ary phase-shift keying (MPSK) signals according to values of bits of the data value to be transmitted. Accordingly, because the modulation schemes use both tone and signal phases to represent the data value, the modulation schemes may be referred to as tone-phase-shift keying (TPSK). Further, a TPSK modulation with D allocated tones and M allowed signal phases may be referred to as (D,M)-TPSK.

Aspects presented herein enable a UE to transmit pilot signals, or reference signals (RS), in a manner that maintains a very low PAPR, e.g., approximately 0 dB PAPR. Aspects may relate to a single tone pilot signal or a pilot signal transmitted over multiple tones.

For a TPSK pilot signal, such as an UL signal transmitted from a UE to a base station, in order to maintain 0 dB PAPR, only a single tone can be non-zero at a time. This leads to lower density in the frequency domain. Additionally, frequency-domain filtering and/or up-sampling of channel samples may be needed at different times.

A phase shift due to timing inaccuracy may dominate a delay spread induced channel variation. For example, a 2.6 μs timing offset (for 5 samples at 1.92e6 samples/s) relative to perfect timing causes 30 pi/128 phase shift between tone x and tone x+3, whereas the channel correlation between tone x and x+3 may be greater than 0.9 even with the Extended Typical Urban (ETU) model. It may be preferable to remove a timing induced phase shift before any frequency-domain filtering/up sampling.

Figure 4:
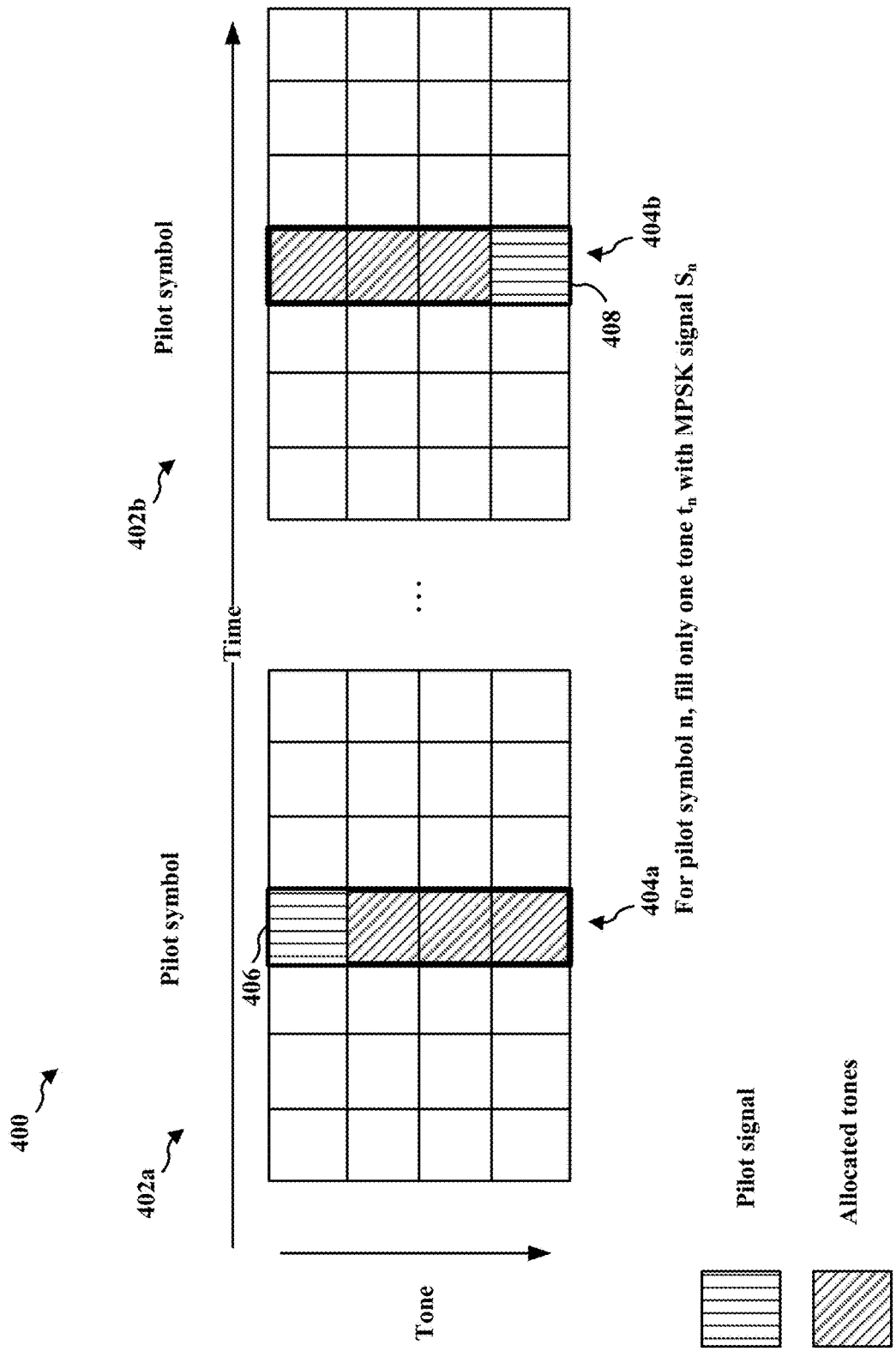
FIG. 4 illustrates an example single tone pilot signal in accordance with aspects presented herein.

FIG. 4 illustrates aspects of an example for transmitting a single tone pilot signal that is selected to maintain a low PAPR, such as approximately 0 dB PAPR. Among other types of modulated signals, the signal may be a TPSK pilot signal. A UE may receive an allocation of resources for an uplink pilot signal, e.g., from an eNB. FIG. 4 illustrates two slots, 402a and 402b spaced in time. Within each slot, the UE is allocated a set of tones 404a, 404b shown with shading in FIG. 4. In this example, a slot is shown having 7 symbols, and the middle symbol is allocated for the pilot in order to maintain 0 dB PAPR, the UE may select a single tone from the respective allocated set of tones for each symbol to transmit the pilot signal. In FIG. 4, for set of tones 404a, the UE selects tone 406 for the pilot signal transmission. For set of tones 404b, the UE selects tone 408 for the pilot signal transmission. Thus, a pilot signal pattern may be transmitted occupying only a single tone transmission per pilot symbol period.

As illustrated in FIG. 4, the tone location of the single tone may change over time. However, at a particular point in time, e.g., for a particular symbol, the pilot signal may be transmitted using a single tone.

A pilot signal pattern may cycle among the allocated tones, or may use multiple tones within the allocated tones. For example, a tone sequence may include a pattern using a plurality of tones in the received allocation of multiple tones. For example, the kth entry of a tone sequence may determine the tone location/index to be used by the kth pilot symbol. The tone sequence pattern should comprise at least two different numbers (tone indices). Multiple tone sequence patterns may be generated which have a minimal number of common entries. This helps to prevent pilots from two sequences from colliding. For example, for 4 tone allocation, two example tone sequences may be [0 2 0 2] and [1 3 1 3], which have 0 common entries. Another example of tone sequences may comprise [0 3 0 3] and [3 0 3 0]. Thus, even if two UEs were allocated the same 4 tones for pilot transmissions, the pilot signals from the two UEs would not collide if each of the UEs used two different tone sequences. A tone sequence is represented by $t_n$, where t represents the tone for pilot signal transmission at time n. In this representation, for a sequence set of length T, n may equal 0, 1, . . . , T−1.

The signal that is transmitted at the selected tone may be modulated using a phase change, such as using MPSK. Thus, for a pilot symbol n, the pilot signal may be transmitted during a tone $t_n$, so as to fill only a single tone, with an MPSK signal. The UE may also select among MPSK signals. Therefore, the pilot signal pattern may cycle among the allocated tones using the tone sequence and also using an MPSK sequence having good correlation properties, e.g., such as existing LTE pilot sequences.

Therefore, a pilot pattern may be defined by at least two sequences: a tone sequence $t_n$ and a signal sequence $s_n$. For a sequence of length T, n=0, 1, . . . , T−1. The tone sequence indicates the location of the pilot signal in time and frequency. FIG. 4 illustrates the two tones of a tone sequence, i.e., [0 3 . . . ]. The signal sequence indicates the signal that is to be transmitted at the corresponding tone. For example, the signal sequence may be based on an MPSK constellation.

Therefore, information can be communicated from the UE based on the selection of the tone and based on the signal transmitted at the tone. If a UE is determines to use $t_n$ and $s_n$, it transmits $s_n$ at tone $t_n$ for the n, n+T, n+2T, . . . pilot symbols. The UE may receive an assignment for $t_n$ and/or $s_n$, or the UE may select a $t_n$ and $s_n$. The sequences $t_n$ and $s_n$ may be selected in order for the UE to cycle among the allocated tones, e.g., using an MPSK sequence having good correlation properties, e.g., such as existing LTE pilot sequences.

The selection of $t_n$ and/or $s_n$ may be made in a manner that avoids multiple UEs selecting the same sequences. In one example, the selection may be based on a random criteria. In another example, the selection of $t_n$ and/or $s_n$ may be based on at least one of a cell identifier (cell ID), a user equipment identifier (UE ID), or a set of tones allocated. The sequences may be selected in order to minimize cross-correlation between sequences. This may allow a UE to transmit an acceptable pilot even when it selects the same tone sequence as another UE, because the signal sequence may be different. When the selection of both the tone sequence and the signal sequence are made in a random manner or in one that reduces the likelihood that different UEs will select the same sequences, it helps a UE to avoid colliding with pilot signals of the other UEs.

Tone sequences, $t_n$, with a regular structure may simplify the implementation. For example, if 4 tones are allocated, such as illustrated in FIG. 4, an example sequence structure of $t_n$=[0 3 0 3 0 3 . . . ], may enable improved performance and simplified implementation.

Figure 5:
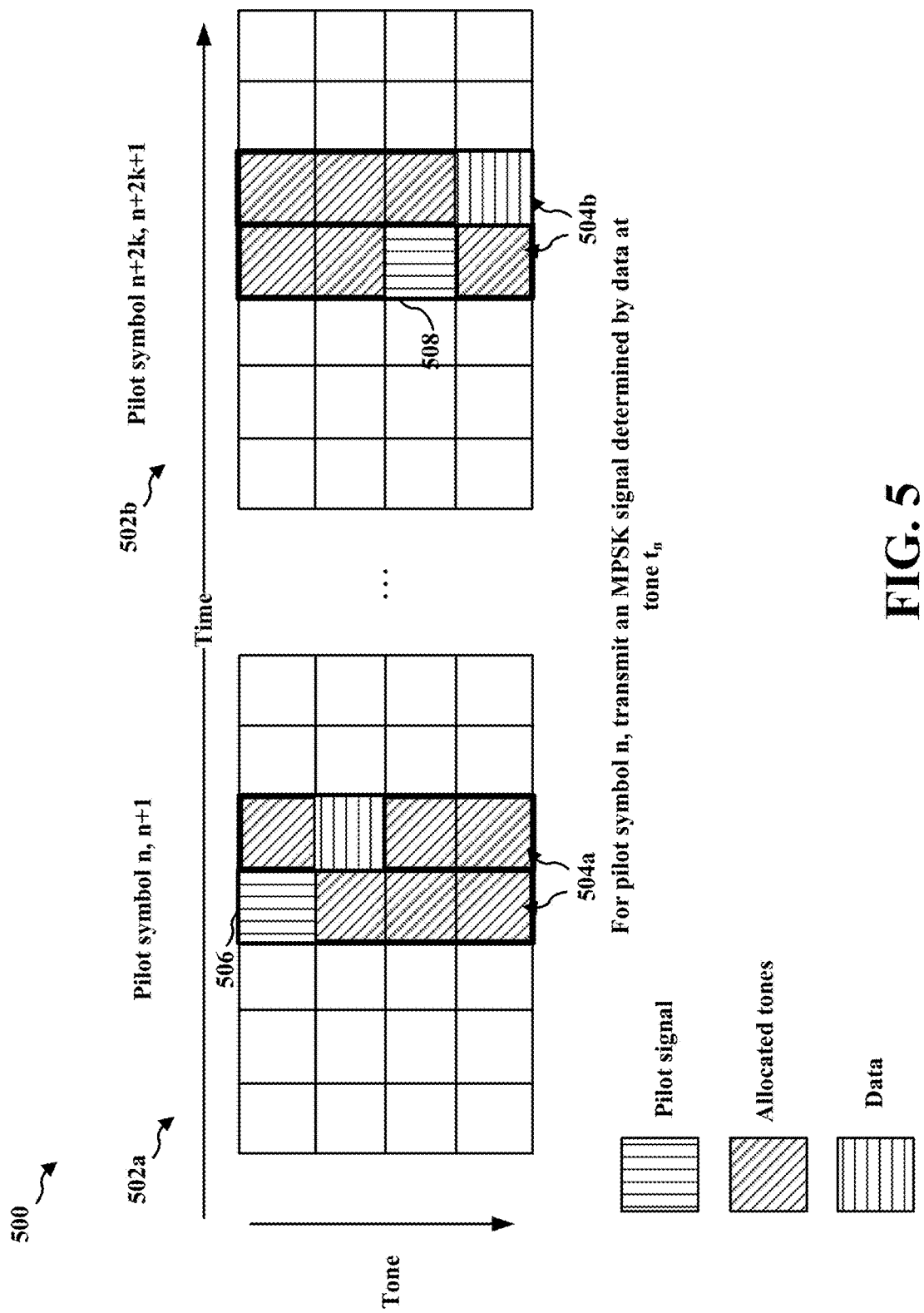
FIG. 5 illustrates an example single tone pilot signal having a linked data transmission in accordance with aspects presented herein.

FIG. 5 illustrates aspects of another example 500 of a single tone pilot signal, such as a TPSK pilot signal. FIG. 5 illustrates slots, 502a and 502b. Within each slot, the UE is allocated a set of tones 504a, 504b shown with shading in FIG. 5. In this example, the UE is allocated two symbols of tones for the pilot signal. In order to maintain 0 dB PAPR, the UE may select a single tone from the respective allocated set of tones to transmit the pilot signal similar to the example in FIG. 4. In FIG. 5, for set of tones 504a, the UE selects 506 for the pilot signal transmission. For set of tones 504b, the UE selects 508 for the pilot signal transmission. Thus, a pilot signal pattern is transmitted using only a single tone transmission at a time/per symbol period.

Two symbols of tones may be allocated to the UE, the two symbols being close in time. FIG. 5 illustrates an example in which the two symbols are adjacent. The UE may use the allocation for both a pilot signal and a data signal. This may enable the UE to keep the pilot, or reference signal, overhead low by transmitting during at least one tone for each of the symbols. The tone sequence of the pilot pattern may determine the nonzero tone to be used for the data transmission. In this manner, the data transmission may be linked to the tone used for the pilot signal according to a tone spacing. The tone spacing, or gap, between $t_n$ and $t_n$+1 may depend on the expected system timing accuracy and channel delay spread, e.g., a small tone spacing may be preferred if the allowed timing offset and/or delay spread are large. The tone spacing may be predefined.

The same signal or different signals may be transmitted at $t_n$, $t_n$+, depending on the desired pilot overhead and exact TPSK format. The UE may determine the data signal to be transmitted at $t_{n+1}$.

Similar to the selection of the tone sequence described in connection with FIG. 4, the selection of the tone sequence in the example illustrated in FIG. 5 may be randomized. For example, the selection of $t_n$ may be based on a randomized criteria, such as cell identifier (cell ID), a user equipment identifier (UE ID), or a set of tones allocated.

As illustrated in FIG. 5, the tone location of the single tone 506, 508 may change over time. However, at a particular point in time, e.g., for a particular symbol, the pilot signal may be transmitted using a single tone. The pilot signal pattern may cycle among the allocated tones.

Although FIGS. 4 and 5 have been illustrated showing an allocation of 4 tones, the aspects may be applied to an allocation of a group of tones of any size. For example, in LTE, 12 tones of a symbol may be allocated to a UE for a pilot signal, also referred to herein as a reference signal (RS) (or a demodulation RS or DM-RS). In narrow band-IOT (NB-IOT), the group of tones for the allocation may be smaller. Regardless of the number of tones within a symbol that are allocated to a UE, the UE may select a single tone to transmit a pilot signal using the aspects described herein.

Multiple Tone Pilot Transmission

In another example, multiple tones of a symbol may be used to transmit the pilot signals. For example, in certain pilot signal designs, all allocated tones of a symbol are used to transmit the pilot signal, e.g. in LTE.

In the example of 8-BPSK, the Power Spectral Density (PSD) has a peak at the center of the pilot signal transmission and attenuates at the edges of the transmission. Channel estimation errors at different tone may have a different impact on performance. Thus, it may be better to transmit a pilot signal using the same PSD. It is important to find a sequence with a good cross-correlation and a low PAPR.

Figure 6:
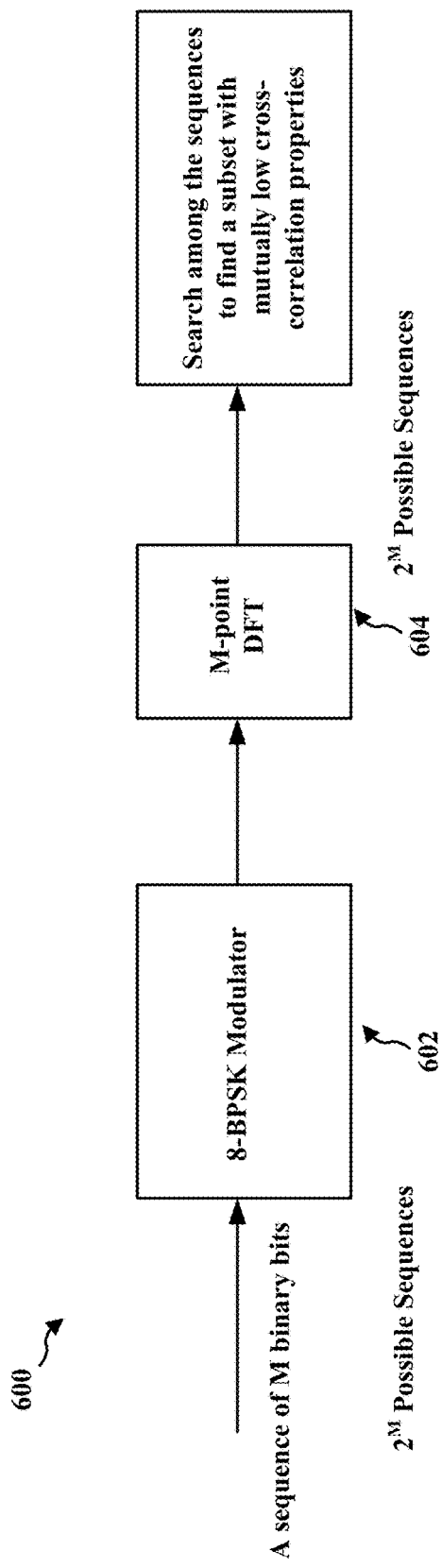
FIG. 6 illustrates an example selection of a multiple tone pilot signal sequence in accordance with aspects presented herein.

Thus, for multi-tone pilot signals, a set of pilot sequences having good cross-correlation properties may be found through a computer search. The search may be conducted, e.g., over all sequences at the output of 8-BPSK modulator and Discrete Fourier Transform (DFT). FIG. 6 illustrates an example process 600 of generating potential sequences and then selecting a subset of sequences for pilot signal transmission.

Initially, a set of potential pilot signal sequences is generated using BPSK modulation of M binary bits, e.g., via an 8-BPSK modulator 602. An M-point DFT 604 may also be applied in generating the set of potential pilot signal sequences. $2^M$ possible sequences may be generated in this manner. Then, the UE may search among the $2^M$ possible sequences to identify a subset having mutually low cross-correlation properties. In one example, M may be 8 or 12. The UE may then select one of sequences within the identified subset of sequences for transmission of the pilot signal.

This method of selecting a sequence for the pilot signal provides an optimal PSD and low PAPR for the pilot signal.

The selection of the sequence from within the identified subset may be made in a way that helps UEs to avoid selecting colliding sequences. In one example, the selection may be based on a randomized criteria. In another example, the selection of may be based on at least one of a cell identifier (cell ID), a user equipment identifier (UE ID), or a set of tones allocated.

In one example, the signal immediately before Inverse Fast Fourier Transform (IFFT) might no longer be MPSK and have varying magnitude.

In one example, for 12 tones, a UE may choose among columns of Hadamard matrix, e.g.,

| s = hadamard(12), s = s(:, 2, 3, 8, 9, 10, 11), after 8-BPSK modulation and DFT, y'*y= | | | | | |
|---|---|---|---|---|---|
| 12.0000 | 0.0000 | 3.8323 | 2.8284 | 1.0824 | 2.8284 |
| 0.0000 | 12.0000 | 2.0840 | 3.4641 | 2.8284 | 1.0824 |
| 3.8323 | 2.0840 | 12.0000 | 2.8284 | 2.6131 | 2.6131 |
| 2.8284 | 3.4641 | 2.8284 | 12.0000 | 0.0000 | 2.6131 |
| 1.0824 | 2.8284 | 2.6131 | 0.0000 | 12.0000 | 0.5858 |
| 2.8284 | 1.0824 | 2.6131 | 2.6131 | 0.5858 | 12.0000 |

In another example, pilot signals may be defined with MPSK signals of varying magnitude before IFFT.

In addition to searching among the set of possible sequences for those having good cross-correlation properties, the search may be made for sequences having low PAPR. Thus, the identification of the subset of sequences may be based on both correlation properties and PAPR.

Figure 7:
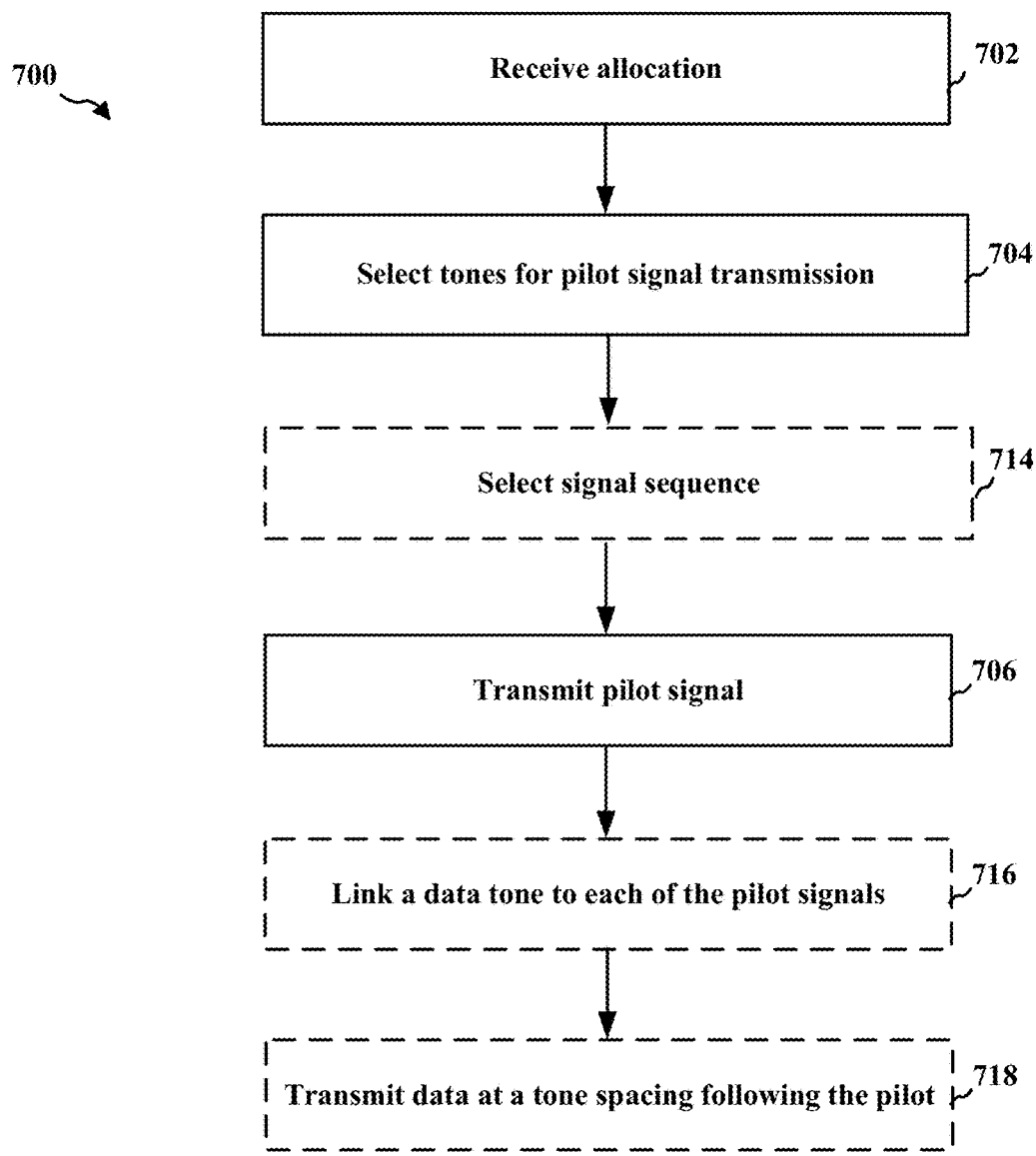
FIG. 7 is a flowchart of an example method of wireless communication.

FIG. 7 is a flowchart 700 of a method of wireless communication for transmitting a pilot signal that is selected to maintain a low PAPR, such as approximately 0 dB PAPR. The method may be performed by a UE (e.g., the UE 104, 350, the apparatus 800, 900). Optional aspects in FIG. 7 are shown with a dashed line.

At 702, the UE receives an allocation for multiple tones. The allocation may be received, e.g., from an eNB, such as eNB 102, 310. The allocation may be for uplink transmissions from the UE, such as a pilot signal transmitted from the UE. FIG. 4 illustrates an example allocation of two sets of tones 404a, 404b to a UE.

At 704, the UE selects tones for transmission of a pilot signal based on a pilot pattern, wherein the pilot pattern comprises a tone sequence, and the tone sequence identifies a sequences of tones, wherein each tone in the tone sequence of identifies one tone of multiple tones for transmission of a pilot signal during a given pilot symbol period. For example, for a TPSK pilot signal, such as an UL signal transmitted from a UE to a base station, in order to maintain 0 dB PAPR, only one tone can be non-zero at a time. For example, a sequence set of tones may be pre-defined and therefore known by the UE. For example, the sequence sets may be defined by a standard or pre-generated by a base station and communicated to the UE. The UE may select among the pre-defined sequence sets in order to determine which pattern of tones should be selected. Example tone sequence sets are described in connection with FIG. 4

Finally, at 706, the UE transmits a modulated pilot signal using the selected tones, wherein the pilot signal is transmitted using a single tone at a time, e.g. per pilot symbol period, such as illustrated in the example of FIG. 4. The tone location may change over time. However, at a particular point in time, e.g., for a particular symbol, the pilot signal may be transmitted using a single tone, e.g., occupying only a single tone.

The tone sequence may include a pattern using a plurality of tones in the received allocation of multiple tones. For example, the kth entry of a tone sequence may determine the tone location/index to be used by the kth pilot symbol. The tone sequence pattern should comprise at least two different numbers (tone indices). Multiple tone sequence patterns may be generated which have a minimal number of common entries. This helps to prevent pilots from two sequences from colliding. For example, for 4 tone allocation, two example tones sequences may be [0 2 0 2] and [1 3 1 3], which have 0 common entries. Thus, pilot signals based on these two sequences will not collide. Other examples of tone sequences are described in connection with FIG. 4.

The method may be used for various modulations while attempting to maintain a low PAPR, such as 0 dB PAPR, or when a low PAPR is preferred. One such modulation is TPSK.

The pilot signal may be modulated with a phase change. For example, the modulated pilot signal may be modulated using m-ary phase shift keying (MPSK). Thus, the signal sequence may be based on an MPSK constellation.

Thus, pilot signal may also comprise a signal sequence. Thus, a pilot pattern may be defined, e.g., by at least two sequences: the tone sequence $t_n$ and the signal sequence $s_n$. For a sequence of length T, n=0, 1, . . . , T−1. The tone sequence indicates the location of the pilot signal in time and frequency. The signal sequence indicates the signal that is to be transmitted at the corresponding tone. Thus, in addition to selecting the tones at 704 for the pilot signal, the UE may also select a signal sequence for the pilot signal at 714.

The UE may select among a predefined sequence set. For example, the tone sequence or the signal sequence for the pilot pattern may be based on at least one of a cell ID, a UE ID, or a set of tones allocated. This allows the selection of the tone sequence or signal sequence to be spread more evenly using the available resources. For example, the mapping between sequence ID and cell ID may be predefined.

Pilot and data transmissions can be linked together to provide better channel estimation with less overhead. In one example, the pilot pattern may comprise a tone sequence, and the UE may also link a data transmission at 716 to a tone following a first tone of the pilot signal. The data transmission may be transmitted using a tone spacing relative to the first tone of the pilot signal. At 718, the UE may transmit the same pilot signal chosen at 714 but at a tone according to the data to be transmitted. As illustrated in connection with FIG. 5, the allocation received by the UE may comprise two symbols close in time; among witch the second symbol serves as both a pilot and data symbol.

In another example, the UE may select one tone of one symbol for the pilot signal and may automatically transmit a data transmission at a tone spaced from the pilot signal by a predefined tone spacing from the pilot signal at the second allocation. The phase of the second signal depends on the data to be transmitted. The tone location of the pilot signal may change for different symbols or allocations, according to the tone sequence of the pilot pattern. The tone location of the data transmission may change while maintaining the same tone spacing from the pilot signal at previous allocation. The predefined tone spacing may be determined based on a timing accuracy of the wireless communication. The linked data transmission may be made using a single tone, similar to the pilot signal.

As discussed in connection with 712, the selection of the tone sequence for such a pilot pattern may be made based on at least one of a cell ID, a UE ID, or a set of tones allocated.

As described in connection with FIG. 5, the UE may transmit a second TPSK pilot signal spaced relative to the TPSK pilot signal based on a timing accuracy. Thus, the selection of the pilot pattern may be based on a timing accuracy of the wireless communication.

Figure 8:
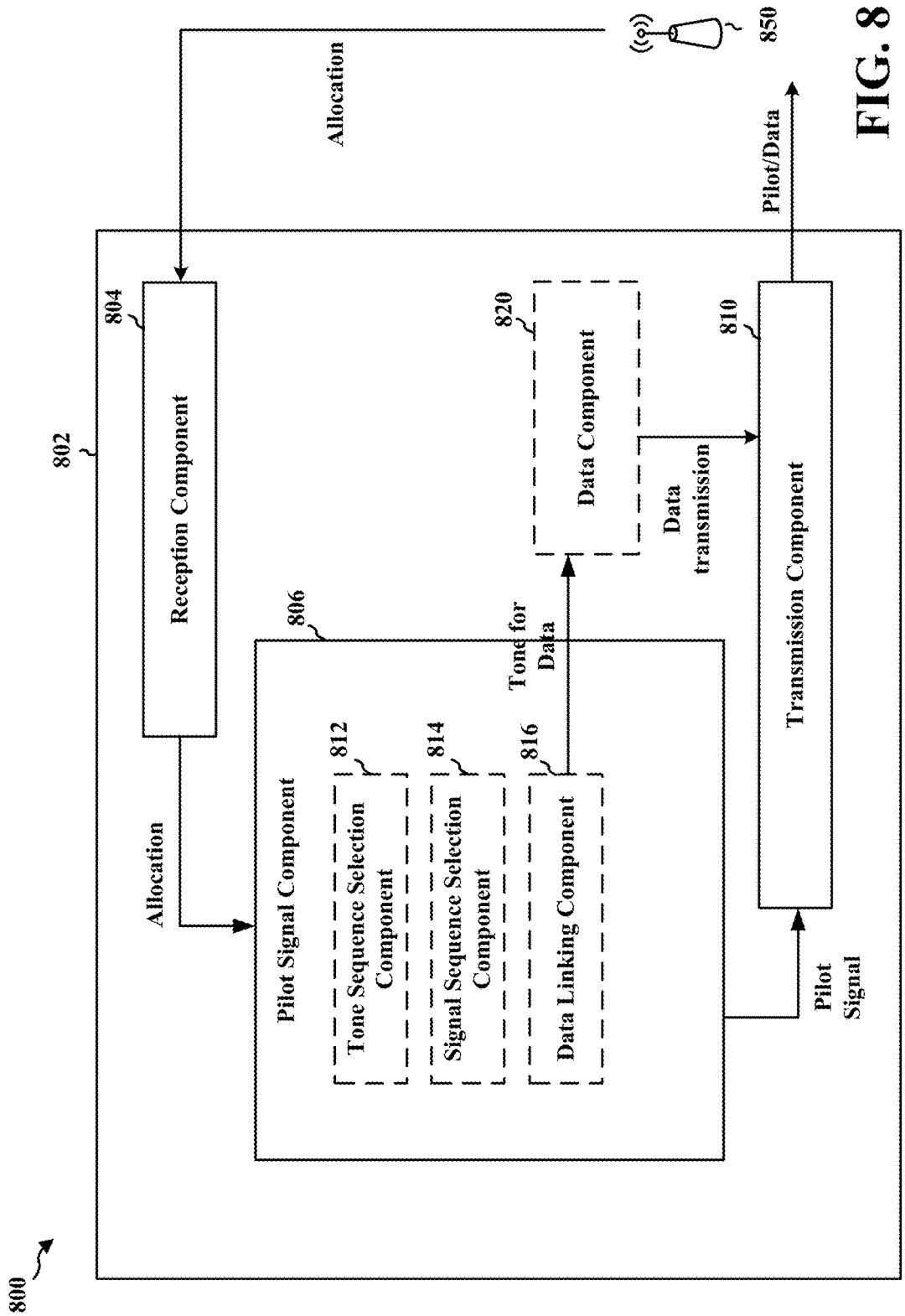
FIG. 8 is a conceptual data flow diagram illustrating the data flow between different means/components in an example apparatus.

FIG. 8 is a conceptual data flow diagram 800 illustrating the data flow between different means/components in an exemplary apparatus 802. The apparatus may be a UE. The apparatus includes a reception component 804 that receives an allocation for multiple tones. The allocation may be received from eNB 850 for an uplink transmission from the apparatus 802.

The apparatus includes a pilot signal component 806 that generates a single tone pilot signal using the allocation for transmission of a pilot signal. The pilot signal component 806 may include a tone sequence selection component 812 that selects tones for transmission of a pilot signal based on a pilot pattern, wherein the pilot pattern comprises a tone sequence, and the tone sequence identifies a sequences of tones, wherein each tone in the tone sequence of identifies one tone of multiple tones for transmission of a pilot signal during a given pilot symbol period. The pilot signal component 806 may also include a signal sequence selection component 814 that selects a signal sequence for the pilot signal.

The apparatus includes a transmission component 810 that transmits a modulated pilot signal using the selected tone, wherein the pilot signal is transmitted using a single tone at a time. The modulated pilot signal may be modulated using MPSK.

The pilot signal component 806 may also include a data linking component 816 that links a data transmission to a tone following a first tone of the pilot signal in time according to a tone spacing relative to the first tone of the pilot signal. The UE may determine the data to be transmitted. Therefore, information regarding the tone designated for the data transmission may be communicated to a data component 820 that determines the content of the data transmission for transmission at the designated tone and provides the data transmission to the transmission component 810.

The apparatus may include additional components that perform each of the blocks of the algorithm in the aforementioned flowcharts of FIG. 7. As such, each block in the aforementioned flowcharts of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
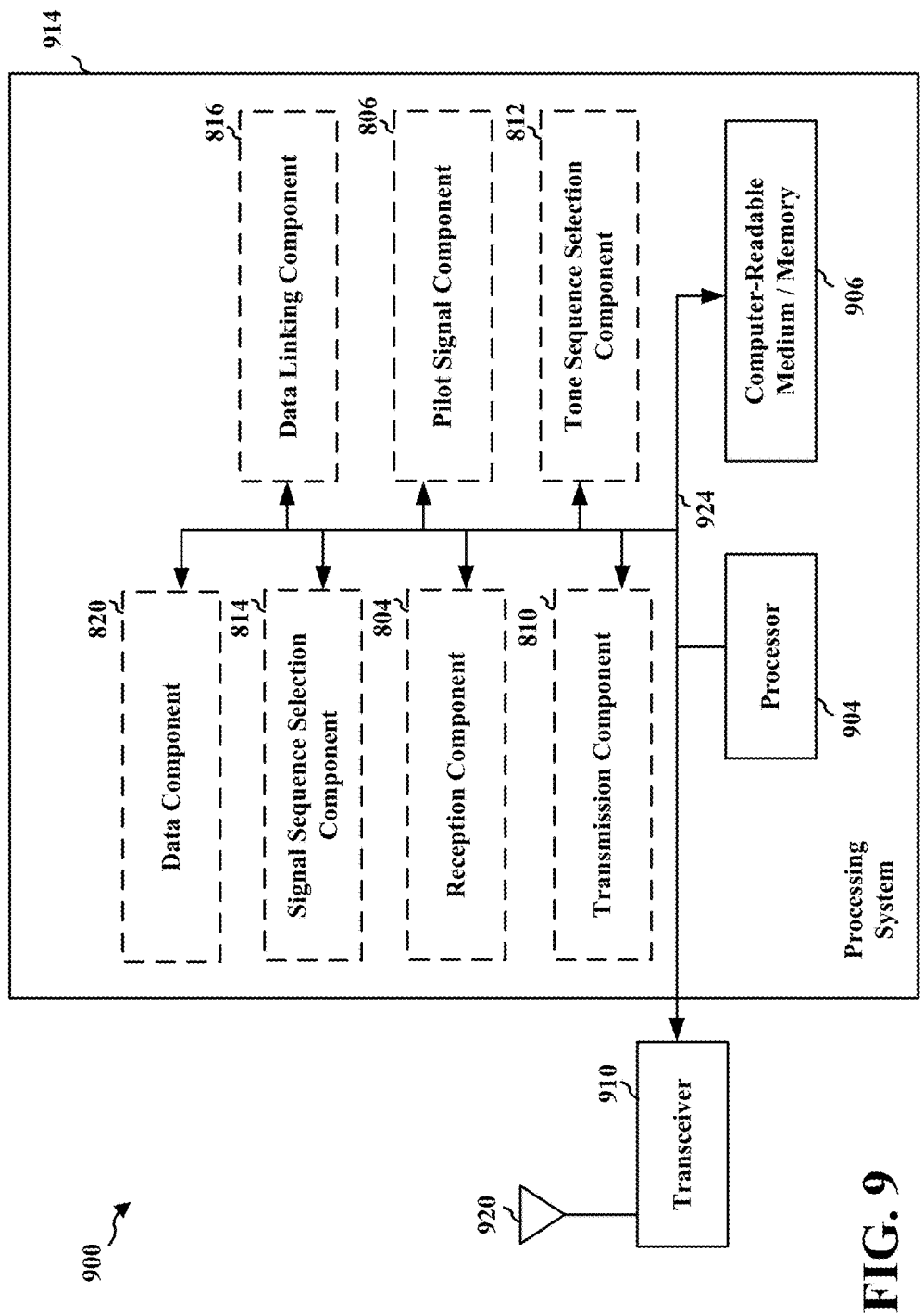
FIG. 9 is a diagram illustrating an example of a hardware implementation for an apparatus employing a processing system.

FIG. 9 is a diagram 900 illustrating an example of a hardware implementation for an apparatus employing a processing system 914. The apparatus may correspond to apparatus 802. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, any of the components 804, 806 810, 812, 814, 816, 818, 820, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 810, and based on the received information, generates a signal to be applied to the one or more antennas 920. The processing system 914 includes a processor 904 coupled to a computer-readable medium/ memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806 810, 812, 814, 816, 818, 820. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359.

In one configuration, the apparatus 802 for wireless communication includes any of means for receiving an allocation for multiple tones; means for selecting tones for transmission of a pilot signal; means for selecting at least one of the tone sequence or the signal sequence for the pilot pattern; means for linking a data transmission to a tone following the single tone pilot signal in time according to a tone spacing relative to the pilot signal tone; and means for transmitting a pilot signal. The aforementioned means may be one or more of the aforementioned components of the apparatus 802 and/or the processing system 914 of the apparatus configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
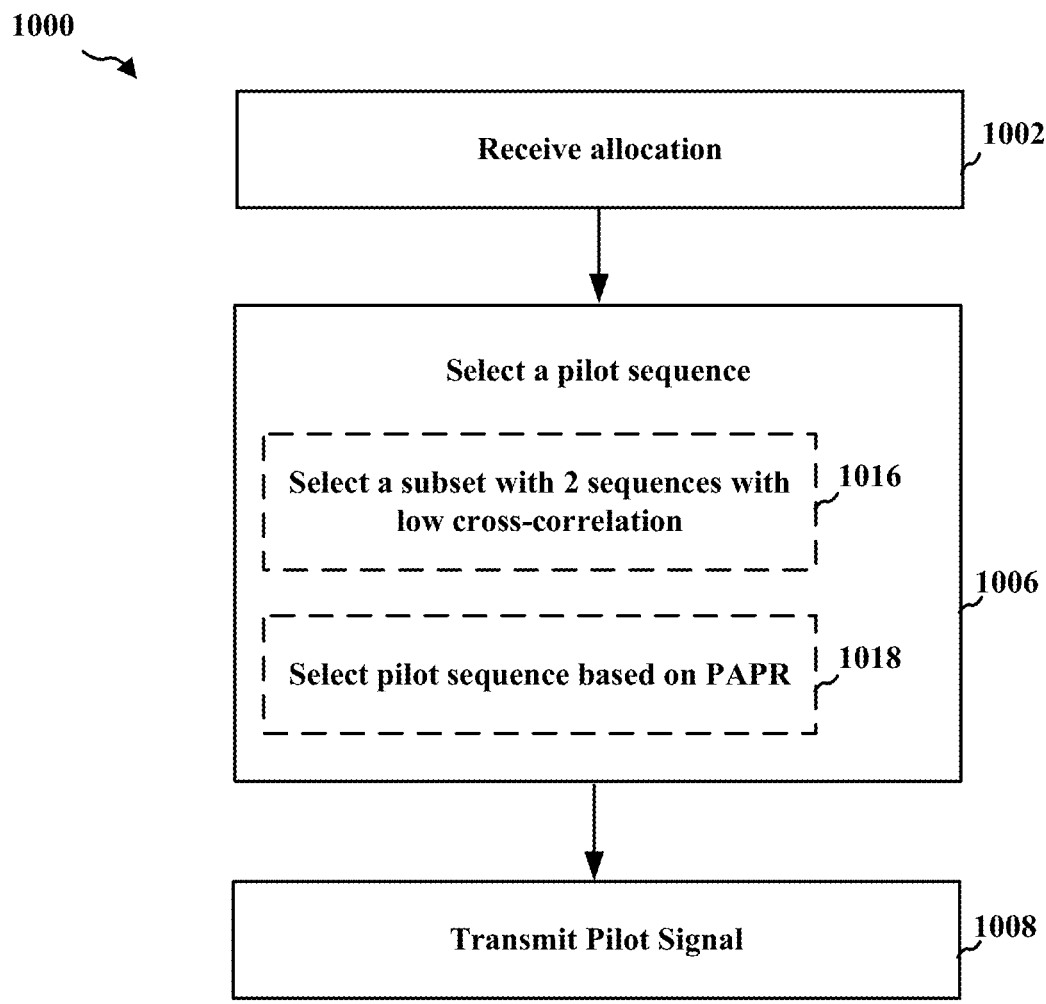
FIG. 10 is a flowchart of an example method of wireless communication.

FIG. 10 is a flowchart 1000 of a method of wireless communication for transmitting a pilot signal using multiple tones of a symbol while maintaining a low PAPR, such as approximately 0 dB PAPR. The method may be performed by a UE (e.g., the UE 104, 350, the apparatus 1100, 1200). At 1002, the UE receives an allocation for a plurality of tones. The allocation may be received, e.g., from an eNB, such as eNB 102, 310. The allocation may be for uplink transmissions from the UE, such as a pilot signal transmitted from the UE. FIGS. 4 and 5 illustrate example allocations of two sets of tones 404a, 404b 504a, 504b to a UE.

In order to transmit a multi-tone modulated pilot signal, at 1006, the UE selects a pilot sequence a set of multi-tone modulated pilot sequences, wherein the set of multi-tone modulated pilot sequences are based on a cross-correlation criteria. Selecting the pilot sequence at 1006 may include the UE selecting at 1016 a subset of the set of multi-tone modulated sequences, the subset comprising at least two sequences having a lower cross-correlation. The pilot sequence may also be selected based on PAPR at 1018.

For example, a set of potential pilot signal sequences may be defined using BPSK modulation of M binary bits, e.g., via an 8-BPSK modulator and an M-point DFT. $2^M$ possible sequences may be generated in this manner. These pilot sequences may be predefined or pre-generated, so that they are known by both the UE and base station. Then, the UE may search among the $2^M$ possible sequences to identify a subset having mutually low cross-correlation properties and/ or low PAPR. The UE may then select one of sequences within the identified subset of sequences for transmission of the pilot signal.

The selection of a sequence for the pilot signal from within the identified subset may be made in a manner that spreads the selection for different UEs across the available resources. For example, the selection of may be based on at least one of a cell ID, a UE ID, or a set of tones allocated.

An example of generating potential sequences and selecting a subset of the sequences is described in connection with FIG. 6.

At 1008, the UE transmits a pilot signal using multiple tones of the allocation using the selected pilot sequence. For example, in certain pilot signal designs, all allocated tones of a symbol may be used to transmit the pilot signal.

The set of pilot sequences may be defined, using MPSK signals. For example, pilot signals may be defined with MPSK signals of varying magnitude before IFFT.

Figure 11:
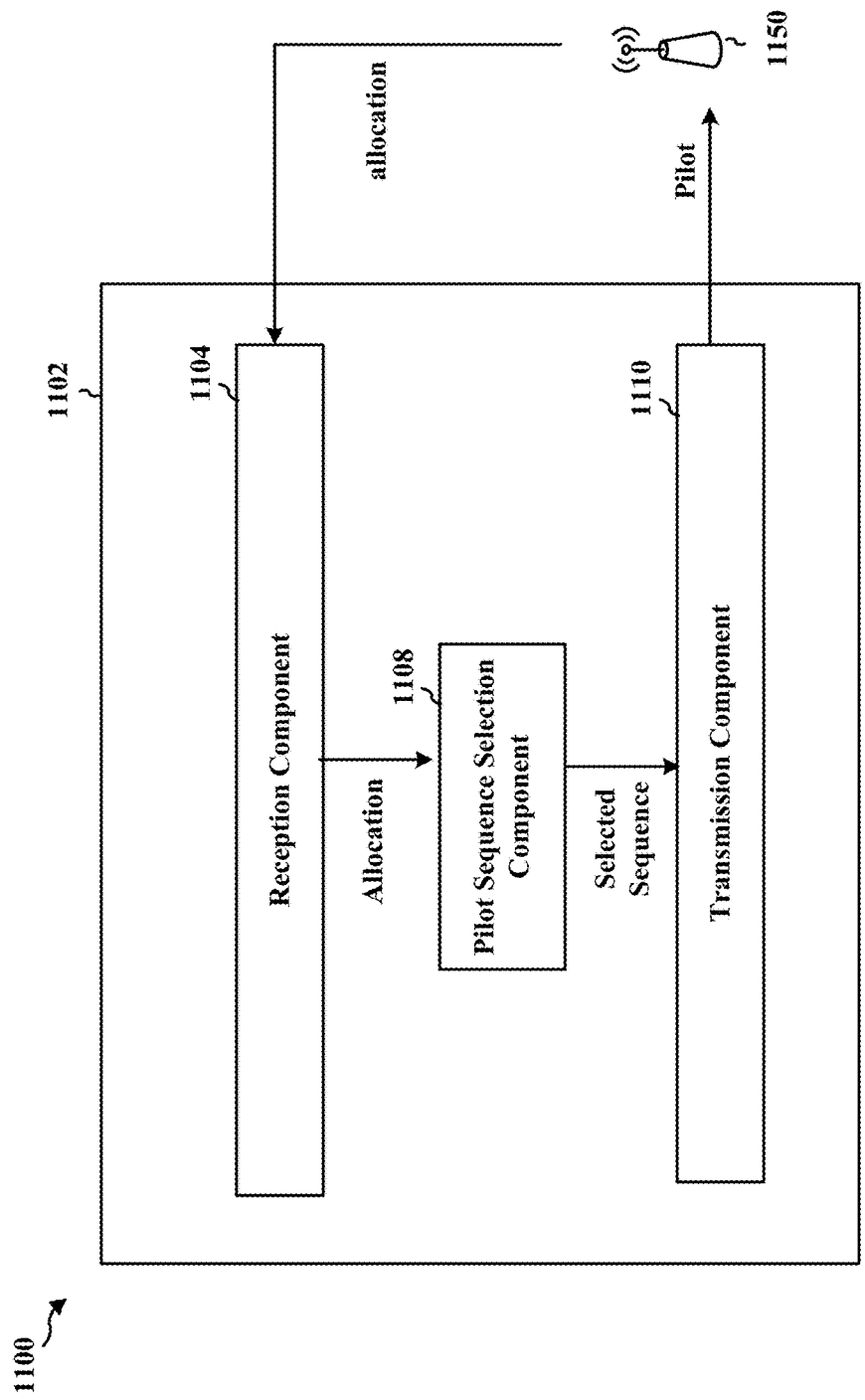
FIG. 11 is a conceptual data flow diagram illustrating the data flow between different means/components in an example apparatus.

FIG. 11 is a conceptual data flow diagram 1100 illustrating the data flow between different means/components in an exemplary apparatus 1102. The apparatus may be a UE. The apparatus includes a reception component 1104 that receives an allocation, e.g. of uplink tones, from eNB 1150 and a pilot sequence selection component 1108 that selects a pilot sequence from a set of multi-tone modulated pilot sequences, wherein the set of multi-tone modulated pilot sequences are based on a cross-correlation criteria and/or PAPR. The multi-tone modulated pilot sequences may be generated, e.g., using 8-BPSK and/or DFT. The sequences may be predefined, e.g., defined by a standard or pre-generated by a base station. The pilot sequence selection component 1108 may use the predefined sequences to select among the pilot sequences. The apparatus includes a transmission component 1110 that transmits a pilot signal using multiple tones of the allocation using the selected pilot sequence. The transmission component 1110 may receive the selected sequence from the pilot sequence selection component 1108.

The apparatus may include additional components that perform each of the blocks of the algorithm in the aforementioned flowcharts of FIG. 10. As such, each block in the aforementioned flowcharts of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
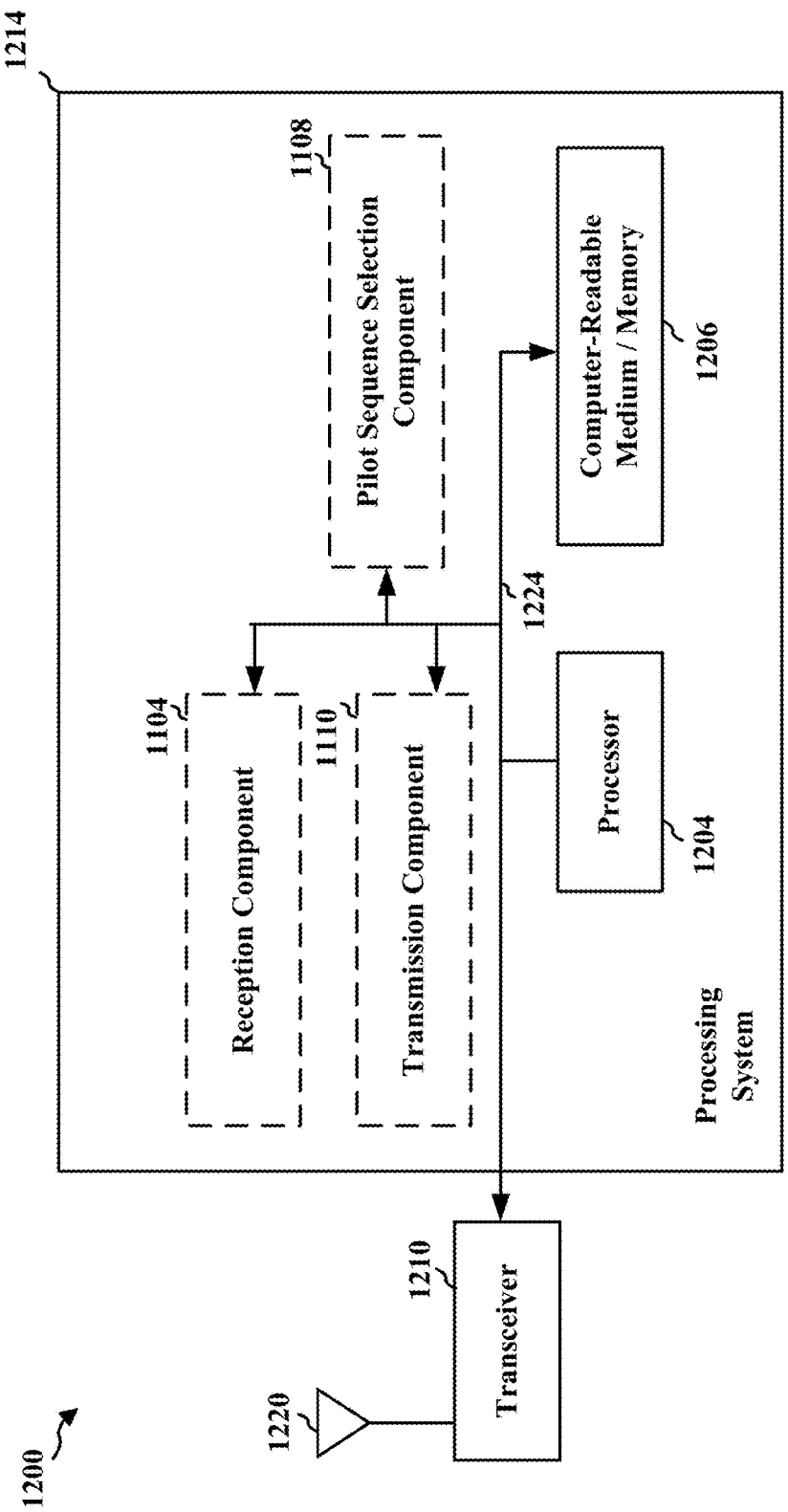
FIG. 12 is a diagram illustrating an example of a hardware implementation for an apparatus employing a processing system.

FIG. 12 is a diagram 1200 illustrating an example of a hardware implementation for an apparatus employing a processing system 1214. The apparatus may correspond to apparatus 1102. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, any of the components 1104, 1108, 1110 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1110, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1108, 1110. The components may be software components running in the processor 1204, resident/stored in the computer readable medium/memory 1206, one or more hardware components coupled to the processor 1204, or some combination thereof. The processing system 1214 may be a component of the UE 350 and may include the memory 360 and/or at least one of the TX processor 368, the RX processor 356, and the controller/processor 359.

In one configuration, the apparatus 1102 for wireless communication includes any of means for receiving an allocation for a plurality of tones; means for selecting a pilot sequence from a set of multi-tone modulated pilot sequences based on a cross-correlation criteria, and means for transmitting a pilot signal. The aforementioned means may be one or more of the aforementioned components of the apparatus 1102 and/or the processing system 1214 of the apparatus configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
   receiving an allocation for multiple tones;
   selecting tones for transmission of a pilot signal based on a pilot pattern, wherein the pilot pattern comprises a signal sequence and a tone sequence identifying a sequence of tones comprised in the allocation for the multiple tones, wherein the tone sequence comprises a single tone of the multiple tones for transmission of a pilot signal during a given pilot symbol period; and
   transmitting a modulated pilot signal using the selected tones, wherein the pilot signal is transmitted using the single tone per pilot symbol period, wherein the modulated pilot signal is modulated with a phase change,
   wherein the tone sequence or signal sequence is based on at least one of a cell identifier (cell ID), a user equipment identifier (UE ID), or a set of tones allocated.

2. The method of claim 1, wherein the modulated pilot signal is modulated using m-ary phase shift keying (MPSK).

3. A method of wireless communication, comprising:
   receiving an allocation for multiple tones;
   selecting tones for transmission of a pilot signal based on a pilot pattern, wherein the pilot pattern comprises a tone sequence identifying a sequence of tones comprised in the allocation for the multiple tones, wherein the tone sequence comprises a single tone of the multiple tones for transmission of a pilot signal during a given pilot symbol period; and
   transmitting a modulated pilot signal using the selected tones, wherein the pilot signal is transmitted using the single tone per pilot symbol period,
   wherein the pilot signal comprises a tone-phase-shift keying (TPSK) pilot signal.

4. The method of claim 3, the method further comprising:
   linking a data transmission to a tone following a first tone of the pilot signal in time, wherein the data transmission is transmitted using a tone spacing relative to the first tone of the pilot signal.

5. The method of claim 4, further comprising:
transmitting a data tone corresponding to each of the pilot signals in the pilot pattern, spaced from the respective pilot signal according to the tone spacing.

6. The method of claim 4, wherein the tone spacing is determined based on a timing accuracy of the wireless communication.

7. The method of claim 4, wherein the data transmission is made using a single tone.

8. The method of claim 3, further comprising:
selecting the tone sequence, wherein the selecting is based on at least one of a cell identifier (cell ID), a user equipment identifier (UE ID), or a set of tones allocated.

9. The method of claim 3, further comprising:
transmitting a second tone-phase-shift keying (TPSK) pilot signal spaced relative to the TPSK pilot signal based on a timing accuracy.

10. An apparatus for wireless communication, comprising:
a memory; and
at least one processor coupled to the memory and configured to:
receive an allocation for multiple tones;
select tones for transmission of a pilot signal based on a pilot pattern, wherein the pilot pattern comprises a tone sequence, and the tone sequence identifies a sequences of tones, wherein each tone in the tone sequence of identifies one tone of multiple tones for transmission of a pilot signal during a given pilot symbol period; and
transmit a modulated pilot signal using the selected tones, wherein the pilot signal is transmitted using a single tone per pilot symbol period,
wherein the modulated pilot signal is modulated with a phase change, wherein the pilot pattern further comprises a signal sequence, and wherein the tone sequence or signal sequence is based on at least one of a cell identifier (cell ID), a user equipment identifier (UE ID), or a set of tones allocated.

11. The apparatus of claim 10, wherein the modulated pilot signal is modulated with a phase change, and wherein the modulated pilot signal is modulated using m-ary phase shift keying (MPSK).

12. An apparatus for wireless communication, comprising:
a memory; and
at least one processor coupled to the memory and configured to:
receive an allocation for multiple tones;
select tones for transmission of a pilot signal based on a pilot pattern, wherein the pilot pattern comprises a tone sequence, and the tone sequence identifies a sequences of tones, wherein each tone in the tone sequence of identifies one tone of multiple tones for transmission of a pilot signal during a given pilot symbol period; and
transmit a modulated pilot signal using the selected tones, wherein the pilot signal is transmitted using a single tone per pilot symbol period, wherein the pilot signal comprises a tone-phase-shift keying (TPSK) pilot signal, and wherein the at least one processor is further configured to:
link a data transmission to a tone following a first tone of the pilot signal in time, wherein the data transmission is transmitted using a tone spacing relative to the first tone of the pilot signal; and
transmit a data tone corresponding to each of the pilot signals in the pilot pattern, spaced from the respective pilot signal according to the tone spacing.

13. An apparatus for wireless communication, comprising:
a memory; and
at least one processor coupled to the memory and configured to:
receive an allocation for multiple tones;
select tones for transmission of a pilot signal based on a pilot pattern, wherein the pilot pattern comprises a tone sequence, and the tone sequence identifies a sequences of tones, wherein each tone in the tone sequence of identifies one tone of multiple tones for transmission of a pilot signal during a given pilot symbol period; and
transmit a modulated pilot signal using the selected tones, wherein the pilot signal is transmitted using a single tone per pilot symbol period, the at least one processor is further configured to:
select a tone sequence based on at least one of a cell identifier (cell ID), a user equipment identifier (UE ID), or a set of tones allocated.

14. An apparatus for wireless communication, comprising:
a memory; and
at least one processor coupled to the memory and configured to:
receive an allocation for multiple tones;
select tones for transmission of a pilot signal based on a pilot pattern, wherein the pilot pattern comprises a tone sequence, and the tone sequence identifies a sequences of tones, wherein each tone in the tone sequence of identifies one tone of multiple tones for transmission of a pilot signal during a given pilot symbol period; and
transmit a modulated pilot signal using the selected tones, wherein the pilot signal is transmitted using a single tone per pilot symbol period, wherein the pilot signal comprises a tone-phase-shift keying (TPSK) pilot signal, and the at least one processor is further configured to:
transmit a second tone-phase-shift keying (TPSK) pilot signal spaced relative to the TPSK pilot signal based on a timing accuracy.

15. A method of wireless communication comprising:
receiving an allocation for a plurality of tones;
selecting a pilot sequence from a set of multi-tone modulated pilot sequences, wherein the set of multi-tone modulated pilot sequences are based on a cross-correlation criteria and a peak-to-average-power-ratio (PAPR), and wherein the pilot sequence is based on at least one of a cell identifier (cell ID), a user equipment identifier (UE ID), or a set of tones allocated; and
transmitting a pilot signal using multiple tones based on the selected pilot sequence and based on the allocation.

16. The method of claim 15, wherein selecting the pilot sequence comprises selecting a subset of the set of multi-tone modulated sequences, the subset comprising at least two sequences having a lower cross-correlation.

17. The method of claim 15, wherein the pilot signal is generated using 8-binary-phase-shift-keying (8-BPSK) modulation.

18. The method of claim 15, wherein the pilot signal is generated using Discrete Fourier Transform (DFT).

19. The method of claim 15, wherein the multi-tone modulated pilot sequences are defined using MPSK signals.

20. An apparatus for wireless communication, comprising:
a memory; and
at least one processor coupled to the memory and configured to:
receive an allocation for a plurality of tones;
select a pilot sequence from a set of multi-tone modulated pilot sequences, wherein the set of multi-tone modulated pilot sequences are based on a cross-correlation criteria and a peak-to-average-power-ratio (PAPR), and wherein the pilot sequence is based on at least one of a cell identifier (cell ID), a user equipment identifier (UE ID), or a set of tones allocated; and
transmit a pilot signal using multiple tones based on the selected pilot sequence and based on the allocation.

21. The apparatus of claim 20, wherein selecting the pilot sequence comprises selecting a subset of the set of multi-tone modulated sequences, the subset comprising at least two sequences having a lower cross-correlation.

22. The apparatus of claim 20, wherein the pilot signal is generated using at least one of 8-binary-phase-shift-keying (8-BPSK) modulation and Discrete Fourier Transform (DFT).

23. An apparatus for wireless communication, comprising:
means for receiving an allocation for multiple tones;
means for selecting tones for transmission of a pilot signal based on a pilot pattern, wherein the pilot pattern comprises a signal sequence and a tone sequence identifying a sequence of tones comprised in the allocation for the multiple tones, wherein the tone sequence comprises a single tone of the multiple tones for transmission of a pilot signal during a given pilot symbol period; and
means for transmitting a modulated pilot signal using the selected tones, wherein the pilot signal is transmitted using the single tone per pilot symbol period, wherein the modulated pilot signal is modulated with a phase change,
wherein the tone sequence or signal sequence is based on at least one of a cell identifier (cell ID), a user equipment identifier (UE ID), or a set of tones allocated.

24. A non-transitory computer-readable medium storing computer executable code for wireless communication, comprising code to:
receive an allocation for multiple tones;
select tones for transmission of a pilot signal based on a pilot pattern, wherein the pilot pattern comprises a signal sequence and a tone sequence identifying a sequence of tones comprised in the allocation for the multiple tones, wherein the tone sequence comprises a single tone of the multiple tones for transmission of a pilot signal during a given pilot symbol period; and
transmit a modulated pilot signal using the selected tones, wherein the pilot signal is transmitted using the single tone per pilot symbol period, wherein the modulated pilot signal is modulated with a phase change,
wherein the tone sequence or signal sequence is based on at least one of a cell identifier (cell ID), a user equipment identifier (UE ID), or a set of tones allocated.

25. An apparatus for wireless communication comprising:
means for receiving an allocation for a plurality of tones;
means for selecting a pilot sequence from a set of multi-tone modulated pilot sequences, wherein the set of multi-tone modulated pilot sequences are based on a cross-correlation criteria and a peak-to-average-power-ratio (PAPR), and wherein the pilot sequence is based on at least one of a cell identifier (cell ID), a user equipment identifier (UE ID), or a set of tones allocated; and
means for transmitting a pilot signal using multiple tones based on the selected pilot sequence and based on the allocation.

26. A non-transitory computer-readable medium storing computer executable code for wireless communication, comprising code to:
receive an allocation for a plurality of tones;
select a pilot sequence from a set of multi-tone modulated pilot sequences, wherein the set of multi-tone modulated pilot sequences are based on a cross-correlation criteria and a peak-to-average-power-ratio (PAPR), and wherein the pilot sequence is based on at least one of a cell identifier (cell ID), a user equipment identifier (UE ID), or a set of tones allocated; and
transmit a pilot signal using multiple tones based on the selected pilot sequence and based on the allocation.

* * * * *